United States Patent [19]

Rathborne et al.

[11] 4,380,457

[45] Apr. 19, 1983

[54] SEPARATION OF AIR

[75] Inventors: Brian A. Rathborne, Northbridge; Bruce R. Ryan, Woronora, both of Australia

[73] Assignee: BOC Limited, Brentford, England

[21] Appl. No.: 44,826

[22] Filed: Jun. 1, 1979

[30] Foreign Application Priority Data

May 25, 1978 [AU] Australia ............................. PD4508

[51] Int. Cl.³ .......................... B01D 53/04; F25J 3/04
[52] U.S. Cl. ........................................ 55/33; 55/62; 55/74; 55/179; 55/387; 62/18
[58] Field of Search ................... 55/31, 33, 62, 74, 75, 55/82, 179, 387, 389; 62/13, 14, 18, 31

[56] References Cited

U.S. PATENT DOCUMENTS

| | | | |
|---|---|---|---|
| 3,358,460 | 12/1967 | Smith et al. | 62/13 X |
| 3,375,674 | 4/1968 | Berker | 62/13 |
| 3,718,005 | 2/1973 | McDermott | 62/18 X |
| 3,722,226 | 3/1973 | McDermott et al. | 62/13 |
| 3,780,534 | 12/1973 | Lofredo et al. | 62/18 X |
| 3,967,464 | 7/1976 | Cormier et al. | 62/13 |
| 4,152,130 | 5/1979 | Theobald | 62/18 |

FOREIGN PATENT DOCUMENTS

| | | |
|---|---|---|
| 737387 | 9/1955 | United Kingdom . |
| 798584 | 7/1958 | United Kingdom . |
| 939409 | 10/1963 | United Kingdom . |
| 977220 | 12/1964 | United Kingdom . |
| 998751 | 7/1965 | United Kingdom . |

Primary Examiner—Robert H. Spitzer
Attorney, Agent, or Firm—David L. Rae; Larry R. Cassett

[57] ABSTRACT

An air separation process for obtaining high purity oxygen and nitrogen comprises the steps of cooling compressed air in a heat exchanger to remove its water content; removing carbon dioxide from the dried air in an adsorption unit; further cooling the dry $CO_2$-free air and passing the residue to a rectification column; regenerating the beds of the adsorption unit with waste nitrogen from the rectification column; and purging water from the heat exchanger with the effluent gas obtained from regeneration in the adsorption unit.

4 Claims, 1 Drawing Figure

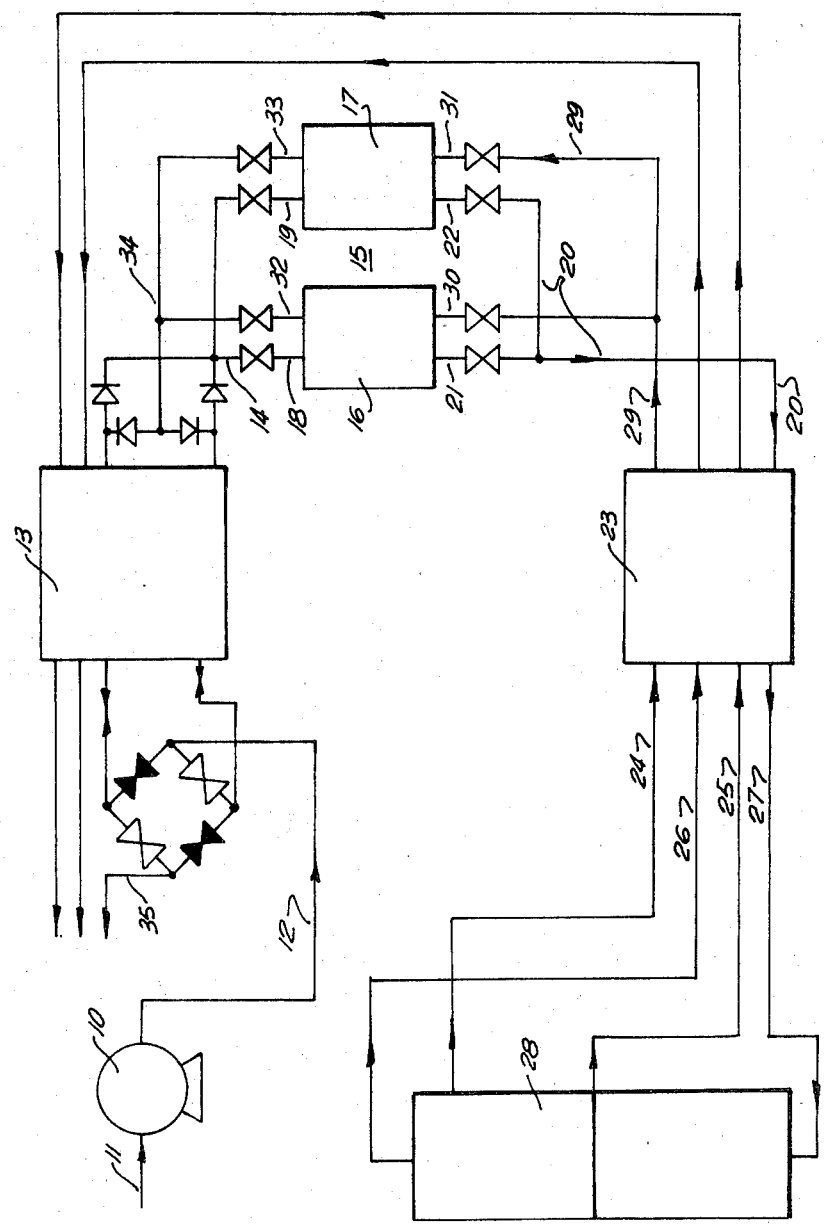

SEPARATION OF AIR

This invention relates to air separation processes and in particular to improved methods and means for air purification prior to separation of oxygen and nitrogen by fractionation.

Preferred embodiments of the invention enable a greater yield of products to be obtained than has been possible from processes employing reversing heat exchangers as an air feedstock purification means.

Air separation processes conceptually involve three phases. These are (1) air purification, (2) partial liquefaction of the purified air, and (3) fractionation thereof to separate oxygen from nitrogen.

In the past water and carbon dioxide, which may be regarded as impurity components of the air feedstock, have been both removed by adsorbers prior to passing the dried carbon dioxide free gas mixture for subsequent air separation processing. As in that purification method the adsorbers are thermally reactivated an additional load is placed upon the cooling mechanism of an air separation plant to remove the heat thus imparted to the gas mixture, and this is preferably to be avoided.

Another method employed is to pass air through a reversing heat exchanger in which water and carbon dioxide are removed by cooling. The dried carbon dioxide free gas mixture to be separated then passes to the rectification column. A portion of gaseous nitrogen is taken from the rectification column to remove the accumulated withdrawn components from the reversing heat exchanger.

This method has the disadvantage that when removal of the accumulated water and carbon dioxide takes place in the reversing heat exchanger approximately 45% by volume of the products from the separation column is removed in the form of waste gaseous nitrogen to be passed through the heat exchanger in order to remove by evaporation the water and carbon dioxide accumulated therein.

The present invention proposes a more economic process for air separation by decreasing the amount of product nitrogen removed to waste for the removal of accumulated components separated from air being supplied to the rectification column of an air separation plant.

According to one aspect the invention consists in an air separation process comprising the steps of:
(1) extracting the water content from a quantity of air by cooling said air;
(2) removing at least one component from the cooled dried air produced in the first step by contact thereof with one or more adsorbent materials;
(3) further cooling the residue of said cooled dried air after removal of said at least one component and then rectifying said residue;
(4) treating said one or more adsorbent materials with an amount of at least one gas obtained from rectification of a said residue thereby to regenerate said adsorbent; and
(5) directing an amount of at least one gas obtained from rectification of a said residue to purge said water from apparatus in which it was extracted in step 1.

According to a second aspect the invention consists in apparatus for carrying out the above-defined process comprising:

means for cooling air to extract a water content therefrom;
adsorbing means for bringing said dried cooled air in contact with at least one adsorbent material whereby substantially to remove at least one component from said dried cooled air;
means for further cooling the residue of said dried cooled air after removal of said at least one component and means for rectifying said residue;
means for regenerating a said adsorbent material by treatment thereof with a gas obtained from said means for rectifying;
means for purging said means for cooling air with a gas obtained from said rectifying.

The invention is particularly suitable for obtaining high purity oxygen and high purity nitrogen from air. The adsorbent bed preferably contains an adsorbent which preferentially adsorbs carbon dioxide from the cooled air stream from which water has been removed, for example, molecular sieve. There may also be provided further adsorbents in the bed, or further beds of adsorbents, which preferentially adsorb other constituents of the air stream, for example acetylene.

When air is separated by a process according to the invention it is preferably the waste nitrogen stream from the rectification column which is used to purge the adsorbent bed and preferably under adiabatic conditions. The waste nitrogen stream is at a lower pressure than that of the feed stream so that the pressure ratio between adsorption and purging of the bed assists in the regeneration of the bed.

A plurality of adsorbent beds are preferably employed and the feeding and regenerating steps for each bed may be sequenced so that a substantially continuous supply of partly purified air is obtained from the beds.

In an air separation process in which the desired product is high purity oxygen, a comparatively large quantity of gaseous nitrogen is also produced. As stated above in a process for air separation wherein water and carbon dioxide are removed simultaneously in a reversing heat exchanger, 45% by volume of the products of the separation column are required to purge the accumulated water and carbon dioxide from a passage of the reversing heat exchanger. In many instances this percentage loss has been acceptable due to the comparatively low commercial demand for nitrogen in comparison to the commercial demand for oxygen.

However that situation is no longer the case and as a consequence it is desirable to reduce the wastage of the produced nitrogen gas to as little as necessary.

It is envisaged that in order to achieve the desired purging according to preferred embodiments of the present invention only approximately 28% nitrogen by volume of the products of the separation column will be required, that being the quantity by the volume necessary to purge the adsorbent bed of adsorbed components and to purge the reversing heat exchanger of accumulated water.

The reduction in the amount of waste nitrogen required is due to the removal within the reversing heat exchanger of water only and removal of carbon dioxide and other constituents by an adsorbent bed, whereas in the earlier known processes where carbon dioxide and water were required to be purged from a reversing heat exchanger the purging of carbon dioxide particularly demanded a large volume of waste nitrogen.

A preferred embodiment of an air separation plant according to the invention will now be more particularly described by way of example and with reference to the accompanying diagrammatic drawing of such a plant.

Referring to the drawing a compressor 10 draws in air through line 11 and delivers compressed air through line 12 to a reversing heat exchanger 13 wherein the compressed air is cooled to approximately 200 degrees Kelvin, the water content being removed by freezing out of the compressed air during its progress through heat exchanger 13 and being deposited as ice in the passage through which the compressed air is being passed. The resultant dried compressed air then passes by line 14 to an adsorption unit 15. The adsorption unit 15 comprises two beds 16 and 17 containing adsorbents which preferentially adsorb carbon dioxide from the dried air, and possibly further adsorbents which preferentially adsorb e.g. acetylene. The air is fed into one or other of the beds 16 or 17 on a timed cycle through valved line 18 or 19. The residue of air from bed 16 or 17 after removal of the carbon dioxide component is delivered into an outlet line 20 through valved line 21 or 22. The residual purified stream of air from which water, carbon dioxide and possibly other constituents, such as acetylene have been removed is passed through line 20 to a heat exchanger 23 which may be a matrix heat exchanger, (non-reversing) or may be a reversing heat exchanger, in which the residual air is further cooled by a stream of waste nitrogen in line 24 a stream of product gaseous oxygen in line 25 and a stream of product gaseous nitrogen in line 26. The cooled residual air stream is then fed into a double rectification column 28 through line 27.

The stream of waste nitrogen from rectification column 28 via line 24 is fed through line 29 to adsorption bed 16 or 17 through valved line 30 or 31 at the time when the bed 16 or 17 is closed to the air inlet feed, to regenerate the adsorbent in that bed. The pressure of the dried air stream fed through beds 16 and 17 is of the order of 6 atmospheres whereas the pressure of the waste nitrogen stream is of the order 1.1 atmospheres so that regeneration is a combination of a depressurising and purging action. The effluent gas stream obtained from bed 16 or 17 is then fed through valved line 32 or 33 into line 34 wherefrom it enters the reversing heat exchanger to purge to atmosphere by line 35 the accumulated water from the passage which fed the air supply from compressor 10 prior to the previous reversal of the air supply passages. As will be appreciated the removal of water from the air supply will bring about icing within the air supply passage of reversing heat exchanger 13. Thus the frequency of reversal of the air supply, and purging by the waste gaseous nitrogen together with other constituents through line 34, will be sequenced so that the amount of ice deposited will not unduly impair the air flow through the passage and also the deposited water and ice will be effectively purged by the waste nitrogen flow through the passage in reverse direction.

It is believed that the quantity of waste nitrogen required for purging is of the order of 28% of the volume of the products of the separation column and is therefore considerably less than that previously required when all constituents removed from the air supply were to be purged from a reversing heat exchanger.

It will be understood that the gases obtained from the rectification process may be streamed separately for regeneration of adsorbents and for purging of water from a heat exchanger in which it is deposited. However that is less efficient than using the same gas successively first for the regeneration step and then for purging water.

We claim:
1. An air separation process comprising:
    (1) passing an air supply under pressure through a passage of a reversing heat exchanger to cool said air to a temperature of about 180° to 230° K. and deposit water in the form of ice in said passage and to form cooled dried air;
    (2) contacting said cooled dried air with at least one bed containing an adsorbent material to remove at least a carbon dioxide component therefrom and to form a residue of cooled dried air and component adsorbed material;
    (3) further cooling said residue of cooled dried air in a heat exchanger to form cooled rectifiable air;
    (4) rectifying said cooled rectifiable air to form separate fractions of product gaseous nitrogen, product gaseous oxygen and waste nitrogen;
    (5) treating said component adsorbed material with said waste nitrogen fraction at a pressure less than the pressure of said cooled dried air to regenerate said adsorbent material and to form a residual waste nitrogen fraction; and
    (6) passing said residual waste nitrogen fraction through said passage of said reversing heat exchanger in reverse direction to the passing of said air supply to purge said water from said exchanger.
2. The process of claim 1 wherein said treating is conducted under substantially adiabatic conditions.
3. The process of claim 1 wherein said cooled rectifiable air formed in step (3) is at a temperature below 110 degrees Kelvin.
4. An air separation process comprising:
    (1) passing an air supply under pressure through a passage of a first reversing heat exchanger to cool said air to a temperature of about 180° to 230° K. and deposit water in the form of ice in said passage and to form cooled dried air;
    (2) contacting said cooled dried air under pressure with at least one bed containing an adsorbent material to remove at least a carbon dioxide component therefrom and to form a residue of cooled dried air and component adsorbed material;
    (3) further cooling said residue of cooled dried air in a second heat exchanger to form cooled rectifiable air;
    (4) rectifying said cooled rectifiable air to form separate fractions of product gaseous nitrogen, product gaseous oxygen and waste nitrogen;
    (5) passing at least one of said fractions through said second heat exchanger to supply the cooling medium therefor;
    (6) interrupting said contacting of said cooled dried air in said at least one bed containing an adsorbent material;
    (7) treating said component adsorbed material with said waste nitrogen fraction under adiabatic conditions and at a pressure less than the pressure of said cooled dried air in said contacting step to regenerate said adsorbent material and to form a residual waste nitrogen fraction;
    (8) interrupting said passing of said air supply through said first reversing heat exchanger;
    (9) passing said residual waste nitrogen fraction through said passage of said first reversing heat exchanger in reverse direction to the passing of said air supply to purge said water from said exchanger.

* * * * *